United States Patent
Wilczynski et al.

(10) Patent No.: US 10,515,433 B1
(45) Date of Patent: Dec. 24, 2019

(54) ZOOM-ADAPTIVE DATA GRANULARITY TO ACHIEVE A FLEXIBLE HIGH-PERFORMANCE INTERFACE FOR A GEOSPATIAL MAPPING SYSTEM

(71) Applicant: Palantir Technologies Inc., Palo Alto, CA (US)

(72) Inventors: Peter Wilczynski, San Francisco, CA (US); Ryan Zheng, Mountain View, CA (US); John Carrino, Redwood City, CA (US); Andrew Elder, New York, NY (US); Andrew Moreland, San Francisco, CA (US); Quentin Spencer-Harper, London (GB)

(73) Assignee: Palantir Technologies Inc., Palo Alto, CA (US)

( * ) Notice: Subject to any disclaimer, the term of this patent is extended or adjusted under 35 U.S.C. 154(b) by 53 days.

(21) Appl. No.: 15/808,608

(22) Filed: Nov. 9, 2017

Related U.S. Application Data (63) Continuation of application No. 15/377,668, filed on Dec. 13, 2016, now Pat. No. 9,865,034.

(51) Int. Cl.
*G06T 3/40* (2006.01)
*G06F 3/0484* (2013.01)
(Continued)

(52) U.S. Cl.
CPC ............ *G06T 3/40* (2013.01); *G06F 3/04845* (2013.01); *G06F 16/29* (2019.01); *G06F 16/444* (2019.01);
(Continued)

(58) Field of Classification Search
None
See application file for complete search history.

(56) References Cited

U.S. PATENT DOCUMENTS 4,899,161 A 2/1990 Morin, Jr. et al.
4,958,305 A 9/1990 Piazza
(Continued)

FOREIGN PATENT DOCUMENTS

AU 2012216622 5/2015
DE 102013222023 A1 1/2015
(Continued)

OTHER PUBLICATIONS

"A First Look: Predicting Market Demand for Food Retails using a Huff Analysis", TRF Policy Solutions, CDFI Fund, Capacity Building Initiative, (Jul. 2012), 1-30.
(Continued)

*Primary Examiner* — Vu Nguyen
(74) *Attorney, Agent, or Firm* — Schwegman Lundberg & Woessner, P.A.

(57) ABSTRACT

A geospatial mapping system can access a geospatial layer data set for a first geographic area defined by a first presentation level, and provide the geospatial layer data set for the first geographic area to a client device to present a visual rendering of the first geographic area. The geospatial mapping system can receive a request to utilize an advanced feature set on a subset of geospatial artifacts located within the first geographic area, and promote, to the geospatial layer data set, an additional geospatial artifact data set for the subset of geospatial artifacts, yielding an updated geospatial layer data set for the first geographic area. The geospatial mapping system can provide the updated geospatial layer data set to the client device to provide the advanced feature set for interacting with the subset of geospatial artifacts located within the first geographic area.

20 Claims, 5 Drawing Sheets

(51) Int. Cl.
*G06F 16/29* (2019.01)
*G06F 16/44* (2019.01)

(52) U.S. Cl.
CPC .............. *G06F 2203/04806* (2013.01); *G06T 2200/16* (2013.01); *G06T 2210/36* (2013.01)

(56) References Cited

U.S. PATENT DOCUMENTS

| | | | |
|---|---|---|---|
| 5,329,108 A | 7/1994 | Lamoure | |
| 5,754,182 A | 5/1998 | Kobayashi | |
| 5,781,195 A | 7/1998 | Marvin | |
| 5,781,704 A | 7/1998 | Rossmo | |
| 6,091,956 A | 7/2000 | Hollenberg | |
| 6,157,747 A | 12/2000 | Szeliski et al. | |
| 6,169,552 B1 | 1/2001 | Endo et al. | |
| 6,173,067 B1 | 1/2001 | Payton et al. | |
| 6,178,432 B1 | 1/2001 | Cook et al. | |
| 6,247,019 B1 | 6/2001 | Davies | |
| 6,389,289 B1 | 5/2002 | Voce | |
| 6,414,683 B1 | 7/2002 | Gueziec | |
| 6,483,509 B1 | 11/2002 | Rabenhorst | |
| 6,529,900 B1 | 3/2003 | Patterson et al. | |
| 6,631,496 B1 | 10/2003 | Li et al. | |
| 6,662,103 B1 | 12/2003 | Skolnick et al. | |
| 6,757,445 B1 | 6/2004 | Knopp | |
| 6,828,920 B2 | 12/2004 | Owen et al. | |
| 6,983,203 B1 | 1/2006 | Wako | |
| 6,985,950 B1 | 1/2006 | Hanson et al. | |
| 7,036,085 B2 | 4/2006 | Barros | |
| 7,158,878 B2 | 1/2007 | Rasmussen | |
| 7,375,732 B2 | 5/2008 | Arcas | |
| 7,379,811 B2 | 5/2008 | Rasmussen et al. | |
| 7,457,706 B2 | 11/2008 | Melero | |
| 7,502,786 B2 | 3/2009 | Liu et al. | |
| 7,519,470 B2 | 4/2009 | Brasche et al. | |
| 7,529,195 B2 | 5/2009 | Gorman | |
| 7,539,666 B2 | 5/2009 | Ashworth et al. | |
| 7,558,677 B2 | 7/2009 | Jones | |
| 7,574,428 B2 | 8/2009 | Leiserowitz et al. | |
| 7,579,965 B2 | 8/2009 | Bucholz | |
| 7,617,314 B1 | 11/2009 | Bansod | |
| 7,620,628 B2 | 11/2009 | Kapur et al. | |
| 7,791,616 B2 | 9/2010 | Ioup et al. | |
| 7,805,457 B1 | 9/2010 | Viola et al. | |
| 7,809,703 B2 | 10/2010 | Balabhadrapatruni et al. | |
| 7,872,647 B2 | 1/2011 | Mayer et al. | |
| 7,894,984 B2 | 2/2011 | Rasmussen et al. | |
| 7,899,611 B2 | 3/2011 | Downs et al. | |
| 7,920,963 B2 | 4/2011 | Jouline et al. | |
| 7,945,852 B1 | 5/2011 | Pilskains | |
| 7,962,281 B2 | 6/2011 | Rasmussen et al. | |
| 7,970,240 B1 | 6/2011 | Chao et al. | |
| 8,010,545 B2 | 8/2011 | Stefik et al. | |
| 8,036,632 B1 | 10/2011 | Cona et al. | |
| 8,065,080 B2 | 11/2011 | Koch | |
| 8,085,268 B2 | 12/2011 | Carrino et al. | |
| 8,134,457 B2 | 3/2012 | Velipasalar et al. | |
| 8,145,703 B2 | 3/2012 | Frishert et al. | |
| 8,200,676 B2 | 6/2012 | Frank | |
| 8,214,361 B1 | 7/2012 | Sandler et al. | |
| 8,214,764 B2 | 7/2012 | Gemmell et al. | |
| 8,229,947 B2 | 7/2012 | Fujinaga | |
| 8,230,333 B2 | 7/2012 | Decherd et al. | |
| 8,290,942 B2 | 10/2012 | Jones et al. | |
| 8,290,943 B2 | 10/2012 | Carbone et al. | |
| 8,301,464 B1 | 10/2012 | Cave et al. | |
| 8,325,178 B1 | 12/2012 | Doyle et al. | |
| 8,368,695 B2 | 2/2013 | Howell et al. | |
| 8,397,171 B2 | 3/2013 | Klassen et al. | |
| 8,400,448 B1 | 3/2013 | Doyle | |
| 8,407,180 B1 | 3/2013 | Ramesh et al. | |
| 8,412,234 B1 | 4/2013 | Gatmir-Motahari et al. | |
| 8,412,707 B1 | 4/2013 | Mianji | |
| 8,422,825 B1 | 4/2013 | Neophytou et al. | |
| 8,452,790 B1 | 5/2013 | Mianji | |
| 8,463,036 B1 | 6/2013 | Ramesh et al. | |
| 8,489,331 B2 | 7/2013 | Kopf et al. | |
| 8,489,641 B1 | 7/2013 | Seefeld et al. | |
| 8,498,984 B1 | 7/2013 | Hwang et al. | |
| 8,508,533 B2 | 8/2013 | Cervelli et al. | |
| 8,510,268 B1 * | 8/2013 | LaForge | G06F 16/29 707/625 |
| 8,514,229 B2 | 8/2013 | Cervelli et al. | |
| 8,515,207 B2 | 8/2013 | Chau | |
| 8,564,596 B2 | 10/2013 | Carrino et al. | |
| 8,742,934 B1 | 6/2014 | Sarpy, Sr. et al. | |
| 8,781,169 B2 | 7/2014 | Jackson et al. | |
| 8,799,799 B1 | 8/2014 | Cervelli et al. | |
| 8,830,322 B2 | 9/2014 | Nerayoff et al. | |
| 8,938,686 B1 | 1/2015 | Erenrich et al. | |
| 8,949,164 B1 | 2/2015 | Mohler | |
| 8,983,494 B1 | 3/2015 | Onnen et al. | |
| 9,009,177 B2 | 4/2015 | Zheng et al. | |
| 9,021,384 B1 | 4/2015 | Beard et al. | |
| 9,104,293 B1 | 8/2015 | Kornfeld et al. | |
| 9,104,695 B1 | 8/2015 | Cervelli et al. | |
| 9,111,380 B2 | 8/2015 | Piemonte et al. | |
| 9,129,219 B1 | 9/2015 | Robertson et al. | |
| 9,146,125 B2 | 9/2015 | Vulcano et al. | |
| 9,280,618 B1 | 3/2016 | Bruce et al. | |
| 9,865,034 B1 | 1/2018 | Wilczynski et al. | |
| 2002/0003539 A1 | 1/2002 | Abe | |
| 2002/0033848 A1 | 3/2002 | Sciammarella et al. | |
| 2002/0116120 A1 | 8/2002 | Ruiz et al. | |
| 2002/0130867 A1 | 9/2002 | Yang et al. | |
| 2002/0130906 A1 | 9/2002 | Miyaki | |
| 2003/0052896 A1 | 3/2003 | Higgins et al. | |
| 2003/0103049 A1 | 6/2003 | Kindratenko et al. | |
| 2003/0144868 A1 | 7/2003 | MacIntyre et al. | |
| 2003/0163352 A1 | 8/2003 | Surpin et al. | |
| 2003/0225755 A1 | 12/2003 | Iwayama et al. | |
| 2004/0030492 A1 | 2/2004 | Fox et al. | |
| 2004/0039498 A1 | 2/2004 | Ollis et al. | |
| 2004/0098236 A1 | 5/2004 | Mayer et al. | |
| 2005/0031197 A1 | 2/2005 | Knopp | |
| 2005/0034062 A1 | 2/2005 | Bufkin et al. | |
| 2005/0080769 A1 | 4/2005 | Gemmell et al. | |
| 2005/0162523 A1 | 7/2005 | Darrell et al. | |
| 2005/0182502 A1 | 8/2005 | Iyengar | |
| 2005/0182793 A1 | 8/2005 | Keenan et al. | |
| 2005/0223044 A1 | 10/2005 | Ashworth et al. | |
| 2005/0267652 A1 | 12/2005 | Allstadt et al. | |
| 2006/0026170 A1 | 2/2006 | Kreitler et al. | |
| 2006/0139375 A1 | 6/2006 | Rasmussen et al. | |
| 2006/0146050 A1 | 7/2006 | Yamauchi | |
| 2006/0149596 A1 | 7/2006 | Surpin et al. | |
| 2006/0200384 A1 | 9/2006 | Arutunian et al. | |
| 2006/0251307 A1 | 11/2006 | Florin et al. | |
| 2006/0259527 A1 | 11/2006 | Devarakonda et al. | |
| 2006/0271277 A1 | 11/2006 | Hu et al. | |
| 2006/0279630 A1 | 12/2006 | Aggarwal et al. | |
| 2007/0011150 A1 | 1/2007 | Frank | |
| 2007/0016363 A1 | 1/2007 | Huang et al. | |
| 2007/0024620 A1 | 2/2007 | Muller-Fischer et al. | |
| 2007/0057966 A1 | 3/2007 | Ohno et al. | |
| 2007/0078832 A1 | 4/2007 | Ott, IV et al. | |
| 2007/0115373 A1 | 5/2007 | Gallagher et al. | |
| 2007/0188516 A1 | 8/2007 | Ioup et al. | |
| 2007/0208497 A1 | 9/2007 | Downs et al. | |
| 2007/0208498 A1 | 9/2007 | Barker et al. | |
| 2007/0258642 A1 | 11/2007 | Thota | |
| 2007/0294643 A1 | 12/2007 | Kyle | |
| 2008/0010605 A1 | 1/2008 | Frank | |
| 2008/0040684 A1 | 2/2008 | Crump et al. | |
| 2008/0077642 A1 | 3/2008 | Carbone | |
| 2008/0082578 A1 | 4/2008 | Hogue et al. | |
| 2008/0098085 A1 | 4/2008 | Krane et al. | |
| 2008/0104019 A1 | 5/2008 | Nath | |
| 2008/0133579 A1 | 6/2008 | Lim | |
| 2008/0163073 A1 | 7/2008 | Becker et al. | |
| 2008/0192053 A1 | 8/2008 | Howell | |
| 2008/0195417 A1 | 8/2008 | Surpin | |
| 2008/0223834 A1 | 9/2008 | Griffiths et al. | |
| 2008/0229056 A1 | 9/2008 | Agarwal et al. | |

(56) References Cited

U.S. PATENT DOCUMENTS

| | | | |
|---|---|---|---|
| 2008/0263468 A1 | 10/2008 | Cappione et al. |
| 2008/0267107 A1 | 10/2008 | Rosenberg |
| 2008/0270468 A1 | 10/2008 | Mao et al. |
| 2008/0278311 A1 | 11/2008 | Grange et al. |
| 2008/0288306 A1 | 11/2008 | MacIntyre et al. |
| 2008/0294678 A1 | 11/2008 | Gorman et al. |
| 2008/0301643 A1 | 12/2008 | Appleton et al. |
| 2009/0027418 A1 | 1/2009 | Maru et al. |
| 2009/0088964 A1 | 4/2009 | Schaaf et al. |
| 2009/0100018 A1 | 4/2009 | Roberts |
| 2009/0115786 A1 | 5/2009 | Shimasaki et al. |
| 2009/0132921 A1 | 5/2009 | Hwangbo et al. |
| 2009/0132953 A1 | 5/2009 | Reed, Jr. et al. |
| 2009/0144262 A1 | 6/2009 | White et al. |
| 2009/0158185 A1 | 6/2009 | Lacevic et al. |
| 2009/0171939 A1 | 7/2009 | Athsani et al. |
| 2009/0172511 A1 | 7/2009 | Decherd et al. |
| 2009/0179892 A1 | 7/2009 | Tsuda et al. |
| 2009/0187447 A1 | 7/2009 | Cheng et al. |
| 2009/0187464 A1 | 7/2009 | Bai et al. |
| 2009/0222400 A1 | 9/2009 | Kupershmidt et al. |
| 2009/0292626 A1 | 11/2009 | Oxford et al. |
| 2010/0057716 A1 | 3/2010 | Stefik et al. |
| 2010/0063961 A1 | 3/2010 | Guiheneuf et al. |
| 2010/0070523 A1 | 3/2010 | Delgo et al. |
| 2010/0076968 A1 | 3/2010 | Boyns et al. |
| 2010/0106420 A1 | 4/2010 | Mattikalli et al. |
| 2010/0162176 A1 | 6/2010 | Dunton |
| 2010/0198684 A1 | 8/2010 | Eraker et al. |
| 2010/0199225 A1 | 8/2010 | Coleman et al. |
| 2010/0277611 A1 | 11/2010 | Holt et al. |
| 2010/0293174 A1 | 11/2010 | Bennett |
| 2010/0321399 A1 | 12/2010 | Ellren et al. |
| 2011/0022312 A1 | 1/2011 | McDonough et al. |
| 2011/0090254 A1 | 4/2011 | Carrino et al. |
| 2011/0117878 A1 | 5/2011 | Barash et al. |
| 2011/0137766 A1 | 6/2011 | Rasmussen et al. |
| 2011/0153368 A1 | 6/2011 | Pierre et al. |
| 2011/0161096 A1 | 6/2011 | Buehler et al. |
| 2011/0170799 A1 | 7/2011 | Carrino et al. |
| 2011/0208724 A1 | 8/2011 | Jones et al. |
| 2011/0218934 A1 | 9/2011 | Elser |
| 2011/0225198 A1 | 9/2011 | Edwards et al. |
| 2011/0238690 A1 | 9/2011 | Arrasvuori et al. |
| 2011/0270705 A1 | 11/2011 | Parker |
| 2012/0066296 A1 | 3/2012 | Appleton et al. |
| 2012/0084118 A1 | 4/2012 | Bai et al. |
| 2012/0106801 A1 | 5/2012 | Jackson |
| 2012/0144335 A1 | 6/2012 | Abeln et al. |
| 2012/0158527 A1 | 6/2012 | Cannelongo |
| 2012/0159363 A1 | 6/2012 | DeBacker et al. |
| 2012/0173985 A1 | 7/2012 | Peppel |
| 2012/0206469 A1 | 8/2012 | Hulubei et al. |
| 2012/0208636 A1 | 8/2012 | Feige |
| 2012/0221580 A1 | 8/2012 | Barney |
| 2012/0323888 A1 | 12/2012 | Osann, Jr. |
| 2013/0006725 A1 | 1/2013 | Simanek et al. |
| 2013/0021445 A1 | 1/2013 | Cossette-Pacheco et al. |
| 2013/0057551 A1 | 3/2013 | Ebert et al. |
| 2013/0060786 A1 | 3/2013 | Serrano et al. |
| 2013/0073377 A1 | 3/2013 | Heath |
| 2013/0076732 A1 | 3/2013 | Cervelli et al. |
| 2013/0100134 A1 | 4/2013 | Cervelli et al. |
| 2013/0101159 A1 | 4/2013 | Chao et al. |
| 2013/0132398 A1 | 5/2013 | Pfeifle |
| 2013/0150004 A1 | 6/2013 | Rosen |
| 2013/0176321 A1 | 7/2013 | Mitchell et al. |
| 2013/0179420 A1 | 7/2013 | Park et al. |
| 2013/0254900 A1 | 9/2013 | Sathish et al. |
| 2013/0268520 A1 | 10/2013 | Fisher et al. |
| 2013/0279757 A1 | 10/2013 | Kephart |
| 2013/0282723 A1 | 10/2013 | Petersen et al. |
| 2013/0339891 A1 | 12/2013 | Blumenberg |
| 2014/0176606 A1 | 6/2014 | Narayan et al. |
| 2014/0218400 A1 | 8/2014 | O'Toole et al. |
| 2014/0333651 A1 | 11/2014 | Cervelli et al. |
| 2014/0337772 A1 | 11/2014 | Cervelli et al. |
| 2014/0361899 A1 | 12/2014 | Layson |
| 2015/0029176 A1 | 1/2015 | Baxter |
| 2015/0070397 A1* | 3/2015 | Miller ................ G06T 3/40 345/660 |
| 2015/0100907 A1 | 4/2015 | Erenrich et al. |
| 2015/0106170 A1 | 4/2015 | Bonica |
| 2015/0186821 A1 | 7/2015 | Wang et al. |
| 2015/0187036 A1 | 7/2015 | Wang et al. |
| 2015/0187100 A1 | 7/2015 | Berry et al. |
| 2015/0312323 A1 | 10/2015 | Peterson |
| 2015/0338233 A1 | 11/2015 | Cervelli et al. |
| 2015/0379413 A1 | 12/2015 | Robertson et al. |

FOREIGN PATENT DOCUMENTS

| | | |
|---|---|---|
| EP | 0763201 A1 | 3/1997 |
| EP | 2575107 A2 | 4/2013 |
| EP | 2858014 A2 | 4/2015 |
| EP | 2963595 A1 | 1/2016 |
| GB | 2516155 A | 1/2015 |
| NL | 2012778 A | 11/2014 |
| NZ | 624557 A | 8/2014 |
| WO | WO-9532424 A1 | 11/1995 |
| WO | WO-2000009529 A2 | 2/2000 |
| WO | WO-2001098925 A2 | 12/2001 |
| WO | WO-2004057268 A2 | 7/2004 |
| WO | WO-2005013200 A1 | 2/2005 |
| WO | WO-2008064207 A2 | 5/2008 |
| WO | WO-2009061501 A1 | 5/2009 |
| WO | WO-2009123975 A1 | 10/2009 |
| WO | WO-2011058507 A1 | 5/2011 |

OTHER PUBLICATIONS

"Amm's Diary: Unconnected ways and other data quality issues", Open Street Map, [Online]. Retrieved from the Internet: <URL: http://www.openstreetmap.org/user/amm/diary>, (Accessed: Jul. 23, 2012), 3 pgs.

"U.S. Appl. No. 15/377,668, Final Office Action dated Jun. 16, 2017", 15 pgs.

"U.S. Appl. No. 15/377,668, Notice of Allowance dated Sep. 11, 2017", 9 pgs.

"Buffer a Polygon", VBForums, [Online]. Retrieved from the Internet: <URL: http://www.vbforums.com/showthread.php?198436-Buffer-a-Polygon>, (Accessed: Oct. 10, 2016).

"Douglas-Peucker-Algorithms", Wikipedia (W/ Machine Translation), [Online]. [Archived Jul. 29, 2011]. Retrieved from the Internet: <URL: http://de.wikipedia.org/w/index.php?title=Douglas-Peucker-Algorithmus&oldid=91846042">, (Last Modified: Jul. 29, 2011), 4 pgs.

"GIS-NET 3 Public Department of Regional Planning", Planning & Zoning Information for Unincorporated LA County, [Online] Retrieved from the internet: <http://gis.planning.lacounty.gov/GIS-NET3_PublicNiewer.html>, (Oct. 2, 2013), 1-2.

"Hunchlab: Heat Map and Kernel Density Calculation for Crime Analysis", Azavea Journal, [Online]. Retrieved from the Internet: <www.azavea.com/blogs/newsletter/v4i4/kernel-density-capabilities-added-to-hunchlab>, (Sep. 9, 2014), 2 pgs.

"Identify—Definition", Downloaded Jan. 22, 2015, (Jan. 22, 2015), 1 pg.

"Map Builder: Rapid Mashup Development Tool for Google and Yahoo Maps!", http://web.archive.org/web/20090626224734/http://www.mapbuilder.net/, (Jul. 20, 2012), 2 pgs.

"Map of San Jose, CA", Retrieved Oct. 2, 2013 from http://maps.google.com, (Oct. 2, 2013), 1 pg.

"Map of San Jose, CA.", Retrieved Oct. 2, 2013 from http://maps.yahoo.com, (Oct. 2, 2013), 1 pg.

"Map of San Jose, CA.", Retrieved Oct. 2, 2013 from http://maps.bing.com, (Oct. 2, 2013), 1 pg.

"Overlay—Definition", Downloaded Jan. 22, 2015, (Jan. 22, 2015), 1 pg.

(56) References Cited

OTHER PUBLICATIONS

"Ramer-Douglas-Peucker algorithm", Wikipedia, [Online]. [Archived May 31, 2013]. Retrieved from the Internet: <URL: http ://enwikipedia.orglw/index.php?title= Ramer-DouglasPeucker_algorithm&oldid= 557739119">, (Jul. 2011), 3 pgs.

"Using the Area of Interest Tools", Sonris, [Online]. Retrieved from the Internet: <URL: http://web.archive.org/web/20061001053327/http://sonris-www.dnr.state.la.us/gis/instruct_files/tutslide12.htm>, (Oct. 1, 2006), 1 pg.

Aquino, J., et al., "JTS Topology Suite: Technical Specifications", Vivid Solutions, Technical Specifications Version 1.4, (Oct. 17, 2003), 1-36.

Barto, "How to: Create Your Own Points of Interest", How to, [Online]. Retrieved from the Internet: <URL:http://www.poieditor.com/articles/howto_create_your_own_points_of_interest/>, (Jul. 22, 2008), 4 pgs.

Carver, Steve, et al., "Real-time visibility analysis and rapid viewshed calculation using a voxel-based modelling approach", (Apr. 13, 2012), 6 pgs.

Chen, et al., "Bringing Order to the Web: Automatically Categorizing Search Results", Proceedings of the SIGCHI conference on Human Factors in Computing Systems, The Hague, The Netherlands, (2000), 145-152.

Dramowicz, Ela, "Retail Trade Area Analysis Using the Huff Model", Directions Magazine, [Online] retrieved from the internet: <http://www.directionsmag.com/articles/retail-trade-area-analysis-using-the-huff-mode1/123411>, (Jul. 2, 2005), 10 pgs.

Ghosh, Pijush K, "A Solution of Polygon Containment, Spatial Planning, and Other Related Problems Using Minkowski Operations", National Centre for Software Technology, Bombay India, Computer Vision, Graphics, and Image Processing, vol. 49, (Feb. 15, 1989), 35 pgs.

Gorr, et al., "Crime Hot Spot Forecasting: Modeling and Comparative Evaluation", Grant 98-IJ-CX-K005, (May 6, 2002), 37 pgs.

Griffith, Daniel A, et al., "A Generalized Huff Model", Geographical Analysis, vol. 14, No. 2, (Apr. 1982), 135-144.

Haralick, Robert M, et al., "Image Analysis Using Mathematical Morphology", IEE Transactions on pattern analysis and machine intelligence, vol. PAMI-9, (Jul. 4, 1987), 532-550.

Hibbert, et al., "Prediction of Shopping Behavior Using a Huff Model Within a GIS Framework", (Mar. 18, 2011), 16 pgs.

Huang, Da Wei, et al., "Systematic and Integrative Analysis of Large Gene Lists Using DAVID Bioinformatics Resources", Nature Protocols, 4.1, (Dec. 2008), 44-57.

Huff, et al., "Calibrating the Huff Model Using ArcGIS Business Analyst", ESRI, (Sep. 2008), 33 pgs.

Huff, David L, "Parameter Estimation in the Huff Model", ESRI, ArcUser, (2003), 34-36.

Ipbucker, C, et al., "Inverse Transformation for Several Pseudo-cylindrical Map Projections Using Jacobian Matrix", ICCSA 2009, Part 1 LNCS 5592, (2009), 2 pgs.

Levine, Ned, "Crime Mapping and the Crimestat Program", Geographical Analysis, vol. 38, (2006), 41-56.

Liu, T., "Combining GIS and the Huff Model to Analyze Suitable Locations for a New Asian Supermarket in the Minneapolis and St. Paul, Minnesota USA", Papers in Resource Analysis, 2012, vol. 14, (2012), 8 pgs.

Mandagere, Nagapramod, "Buffer Operations in GIS", [Online]. Retrieved from the Internet: <URL: http://www-users.cs.umn.edu/~npramod/enc_pdf.pdf>, (Printed: Jan. 20, 2010), 7 pgs.

Murray, C, "Oracle Spatial Developer's Guide-6 Coordinate Systems (Spatial Reference Systems)", [Online]. Retrieved from the Internet<URL:http://docs.oracle.com/cd/B28359_01/appdev.111/b28400.pdf>, (Jun. 2009), 870 pgs.

Pozzi, F., et al., "Vegetation and Population Density in Urban and Suburban Areas in the USA", Presented at the Third International Symposium of Remote Sensing of Urban Areas; Istanbul, Turkey, Jun. 2002, (Jun. 2002), 8 pgs.

Qiu, Fang, "3D Analysis and Surface Modeling", Power point presentation, 26 pgs.

Reddy, Martin, et al., "Under the Hood of GeoVRML 1.0", Proceeding VRML '00 Proceedings of the fifth symposium on Virtual reality modeling language (Web3D-VRML), [Online] Retrieved from the internet: <http://pdf.aminer.org/000/648/038/under_the_hood_of_geovrml.pdf>, (Feb. 2000), 23-28.

Reibel, M., et al., "Areal Interpolation of Population Counts Using Pre-Classified Land Cover Data", Popul Res Policy Rev. 26, (Sep. 19, 2007), 619-633.

Reibel, M., et al., "Geographic Information Systems and Spatial Data Processing in Demography: A Review", Popul Res Policy Rev (2007) 26, (Sep. 6, 2007), 601-618.

Rizzardi, M., et al., "Interfacing U.S. Census Map Files With Statistical Graphics Software: Application and Use in Epidemiology", Statistics in Medicine, vol. 12, (1993), 1953-1964.

Snyder, John P, "Map Projections—A Working Manual", U.S. Geological Survey Professional Paper, 1395, (1987), 29 pgs.

Tangelder, J W.H, et al., "Freeform Shape Matching Using Minkowski Operations", (Jun. 1996), 12 pgs.

Thompson, Mick, "Getting Started with GEO", (Jul. 26, 2011), 3 pgs.

Turner, Andy, "Andy Turner's GISRUK 2012 Notes", Google Drive—https://docs.google.com/document/d/1cTmxg7mVx5gd89lqblCYvDEnHA4QAivH417WpyPsqE4edit?pli=1, (Sep. 16, 2013), 1-15.

Valentini, Giorgio, et al., "Ensembles of Learning Machines", Lecture Notes in Computer Science: Neural Nets, Springer Berlin Heidelberg, (Sep. 26, 2002), 3-20.

Wongsuphasawat, Krist, et al., "Visual Analytics for Transportation Incident Data Sets", Transportation Research Record: Journal of the Transportation Research Board, No. 2138, (2009), 135-145.

Woodbridge, Stephen, "[geos-devel] Polygon simplification", [Online]. Retrieved from the Internet<URL:http://lists.osgeo.org/pipermail/geos-devel/2011-May/005210.html>, (May 8, 2011), 2 pgs.

U.S. Appl. No. 15/377,668, U.S. Pat No. 9,865,034, Dec. 13, 2016, Zoom-Adaptive Data Granularity to Achieve a Flexible High-Performance Interface for a Geospatial Mapping System.

\* cited by examiner

ZOOM-ADAPTIVE DATA GRANULARITY TO ACHIEVE A FLEXIBLE HIGH-PERFORMANCE INTERFACE FOR A GEOSPATIAL MAPPING SYSTEM

PRIORITY APPLICATION

This application is a continuation of, and claims priority to U.S. patent application Ser. No. 15/377,668, filed Dec. 13, 2016, the disclosure of which is incorporated herein in its entirety by reference.

TECHNICAL FIELD

The present disclosure generally relates to the technical field of special-purpose machines that manage geospatial artifact data, including computerized variants of such special-purpose machines and improvements to such variants, and to the technologies by which such special-purpose machines become improved compared to other special-purpose machines that manage geospatial artifact data. In particular, the present disclosure addresses systems and methods for promoting geospatial artifact data.

BACKGROUND

Geographic mapping applications allow users to view a visual rendering of a map at various presentation levels. For example, a user can zoom in and out of the map to view the map at varying levels of granularity. At higher presentation levels (e.g., zoomed out), the number of roads, cities, stores, etc., that fall within the view of the map may be overwhelming if each is presented to a user. Accordingly, current systems often do not present each geographic landmark at higher presentation levels and provide greater granularity as the user chooses to zoom into a particular portion of the map. In some situations, however, a user may want to view geographic landmarks with greater granularity while at a higher presentation level.

BRIEF DESCRIPTION OF THE DRAWINGS

Various ones of the appended drawings merely illustrate example embodiments of the present disclosure and are not intended to limit its scope to the illustrated embodiments. On the contrary, these examples are intended to cover alternatives, modifications, and equivalents as may be included within the scope of the disclosure.

DETAILED DESCRIPTION

Reference will now be made in detail to specific example embodiments for carrying out the inventive subject matter of the present disclosure. In the following description, specific details are set forth in order to provide a thorough understanding of the subject matter. It shall be appreciated that embodiments may be practiced without some or all of these specific details.

Disclosed are systems, methods, and computer-readable storage media for promoting geospatial artifact data into a geospatial layer data set. A geospatial mapping system can present a visual rendering of a geographical area on a user's client device. For example, the geospatial mapping system can present a visual rendering of a world map, country map, city map, etc. The visual rendering of the geographic area can include visual renderings of geospatial artifacts that fall within the geographic area. A geospatial artifact can be a data object created to represent any geographic landmark or item. For example, a geospatial artifact can represent any event, object, path, landmark, person, vehicle, etc., that is geographically located within a geographic area. For example, a geospatial artifact can be a city, road, store, church, event, bus, school, etc., that is geographically located within a geographic area.

The geospatial mapping system can enable a user to adjust a presentation level at which the geographic area is presented. A presentation level can define a portion of the geographic area that is presented to the user. For example, a user can select to zoom in and out to adjust the presentation level, thereby defining the geographic area presented to the user.

The geospatial mapping system can maintain geospatial data defining the geographic area and the geospatial artifacts located within the geographic area. For example, the geospatial data can include map data that generally defines the geographic area, such as land, borders, bodies of water, etc. The geospatial data can also include geospatial artifact data for each geospatial artifact located within the geographic area. The geospatial artifact data for a geospatial artifact can include geographic coordinate data describing the geographic location of the geospatial artifact, as well as additional data describing the geospatial artifact. For example, the geospatial artifact data can include data describing the population of a city, name of a business, type of business, type of event, road name, etc.

To present a visual rendering of a geographical area, the geospatial mapping system can generate a geospatial layer data set that includes geospatial data for the geographic area. This can include map data describing the geographic area as well as a partial or complete set of the geospatial artifact data describing geospatial artifacts that are located within the geographic area. Map data may include the specific points, lines, and polygons required to draw a map on the client machine, and geospatial artifact data may include any subset of the geospatial artifact data which exists for a given set of geospatial artifacts. The geospatial mapping system can provide a generated geospatial layer data set to a user's client device, where it can be used to render the visual rendering of the geographical area.

The geospatial layer data set can also allow the client device to provide the user with a set of features to interact with the geospatial artifacts located within the geographic area. For example, features provided by the client device can include causing presentation of visual labels representing geospatial artifacts, adjusting presentation of the visual labels, accessing additional information describing a geospatial artifact, analytical functions, etc.

At higher presentation levels (e.g., zoomed out) the geographic area presented to the user can be relatively large and include a large number of geospatial artifacts. To reduce latency associated with generating and transmitting a geospatial layer data set, the geospatial mapping system can limit the amount of geospatial artifact data that is included in a geospatial layer data set based on the selected presentation level. For example, at higher presentation level that include a large number of geospatial artifacts, the geospatial mapping system can include a limited portion of the geospatial artifact data in the geospatial layer data set, such as only the geographic coordinate data associated with the geospatial artifacts. In addition, at a higher presentation level, a smaller number of individual points may be required to describe the same line because the granularity of the dataset may become large enough that multiple points are represented by a rendered pixel. Alternatively, at lower presentation levels (e.g., zoomed in) that include a smaller number of geospatial artifacts, the geospatial mapping system can include additional geospatial data in the geospatial layer data set. This additional geospatial data may either reference new geospatial artifacts or provide a more granular set of geospatial data for existing geospatial artifacts. For example, at a high presentation level, the geospatial data for the geospatial artifact referencing the United States may not have the full set of points which reference the coastline of Maine. When zooming in on Maine, however, the geospatial mapping system may choose to include more geospatial data about that specific section of the geospatial artifact.

While the limited portion of the geospatial artifact data may provide a user with a limited feature set to interact with geospatial artifacts, it may be insufficient to provide the user with advanced features. In some instances, a user may desire to perform advanced features while at a higher presentation level. To provide the user with these additional features, the geospatial mapping system can enable the user to promote geospatial artifact data into the geospatial layer data set. This can include geospatial artifact data for all of the geospatial artifacts included in the geographic area or for a subset of the geospatial artifacts. Once promoted, the additional geospatial artifact data can be used to provide the user with the additional features. Allowing a user to promote artifact data by request can enable the user to access the additional features when desired, while also limiting the amount of geospatial data included in a geospatial layer data set to reduce latency.

Figure 1:
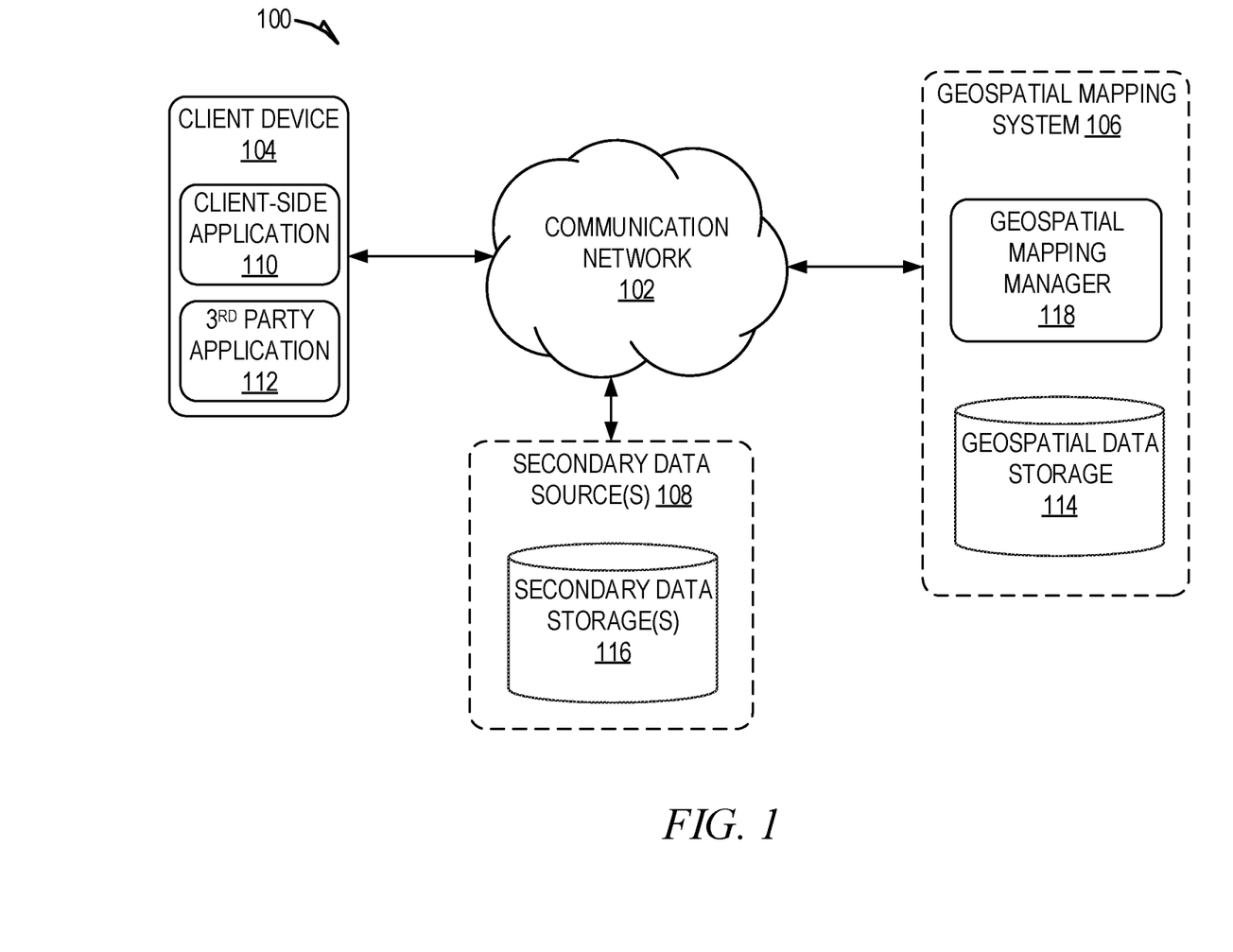
FIG. 1 shows an exemplary system for promoting geospatial artifact data into a geospatial layer data set, according to some example embodiments.

FIG. 1 shows an exemplary system 100 for promoting geospatial artifact data into a geospatial layer data set. While system 100 employs a client-server architecture, the present inventive subject matter is, of course, not limited to such an architecture, and could equally well find application in an event-driven, distributed, or peer-to-peer architecture system, for example. Moreover, it shall be appreciated that although the various functional components of system 100 are discussed in a singular sense, multiple instances of one or more of the various functional components may be employed.

As shown, system 100 can include multiple computing devices connected to communication network 102 and configured to communicate with each other through use of communication network 102. Communication network 102 can be any type of network, including a local area network ("LAN"), such as an intranet; a wide area network ("WAN"), such as the Internet; or any combination thereof. Further, communication network 102 can be a public network, a private network, or a combination thereof. Communication network 102 can also be implemented using any number of communication links associated with one or more service providers, including one or more wired communication links, one or more wireless communication links, or any combination thereof. Additionally, communication network 102 can be configured to support the transmission of data formatted using any number of protocols.

Multiple computing devices can be connected to communication network 102. A computing device can be any type of general computing device capable of network communication with other computing devices. For example, a computing device can be a personal computing device such as a desktop or workstation; a business server; or a portable computing device, such as a laptop, smart phone, or tablet personal computer (PC). A computing device can include some or all of the features, components, and peripherals of computing device 500 of FIG. 5.

To facilitate communication with other computing devices, a computing device can include a communication interface configured to receive a communication, such as a request, data, etc., from another computing device in network communication with the computing device and pass the communication along to an appropriate module running on the computing device. The communication interface can also be configured to send a communication to another computing device in network communication with the computing device.

As shown, system 100 includes client device 104, geospatial mapping system 106 and secondary data source(s) 108, such as high-scale data source(s). In system 100, a user can interact with geospatial mapping system 106 through client device 104 connected to communication network 102 by direct and/or indirect communication. Client device 104 can be any of a variety of types of computing devices that include at least a display, a computer processor, and communication capabilities that provide access to communication network 102 (e.g., a smart phone, a tablet computer, a personal digital assistant (PDA), a personal navigation device (PND), a handheld computer, a desktop computer, a laptop or netbook, or a wearable computing device).

Geospatial mapping system 106 can consist of one or more computing devices and support connections from a variety of different types of client devices 104, such as desktop computers, mobile computers, mobile communications devices (e.g., mobile phones, smart phones, tablets, etc.), smart televisions, set-top boxes, and/or any other network-enabled computing devices. Client device 104 can be of varying types, capabilities, operating systems, etc. Furthermore, geospatial mapping system 106 can concurrently accept connections from and interact with multiple client devices 104.

A user can interact with geospatial mapping system 106 via client-side application 110 installed on client device 104. In some embodiments, client-side application 110 can include a geospatial mapping system-specific component. For example, the component can be a standalone application, one or more application plug-ins, and/or a browser extension. However, the user can also interact with geospatial mapping system 106 via third-party application 112, such as a web browser, that resides on client device 104 and is configured to communicate with geospatial mapping system 106. In either case, client-side application 110 and/or third-party application 112 can present a user interface (UI) for the user to interact with geospatial mapping system 106.

Geospatial mapping system 106 can include geospatial data storage 114 configured to store geospatial data. Geospatial data can include any type of data, such as digital data, documents, text files, audio files, video files, etc. Geospatial data can be data describing a geographic area. For example, geospatial data can include map data defining the geographic area as well as geospatial artifact data for each geospatial artifact located within the geographic area. The geospatial artifact data for a geospatial artifact can include geographic coordinate data describing the geographic location of the geospatial artifact, as well as additional data describing the geospatial artifact. For example, the geospatial artifact data can include data describing the population of a city, name of a business, type of business, type of event, road name, etc.

Geospatial data storage 114 can be a storage device, multiple storage devices, or one or more servers. Alternatively, geospatial data storage 114 can be a cloud storage provider or network storage. High functionality data management system 106 can store data in a storage area network (SAN) device, in a redundant array of inexpensive disks (RAID), etc. Geospatial data storage 114 can store data using one or more partition types, such as FAT, FAT32, NTFS, EXT2, EXT3, EXT4, ReiserFS, BTRFS, and so forth.

System 100 can also include secondary data source(s) 108 that store geospatial data. For example, secondary data source(s) 108 can include secondary data storage(s) 116 configured to store geospatial data.

Geospatial mapping system 106 can include geospatial mapping manager 118 configured to provide a user with a visual rendering of a geographic area. Geospatial mapping manager 118 can receive a request from client device 104 to view a visual rendering of a geographic area, and in response, provide client device 104 with a geospatial layer data set for the geographic area. The geospatial layer data set can include geospatial data for the geographic area that client device 104 can use to render the visual rendering of the geographic area.

The geographic area can be defined by a presentation level selected by a user. For example, the presentation level can indicate a zoom level at which the user would like to view a specified geographic area. The user can adjust the presentation level to view a selected portion of a map at a lower presentation level (e.g., zoomed in) or higher presentation level (e.g., zoomed out), thereby adjusting the geographic area. In some embodiments, the request received from client device 104 can include data identifying the presentation level selected by the user. Geospatial mapping manager 118 can use the received data to determine the geographic area to be presented to the user.

The geospatial layer data set for a geographic area can include map data describing the geographic area as well as a partial or complete set of the geospatial artifact data describing geospatial artifacts that are located within the geographic area. In some embodiments, geospatial mapping manager 118 can generate a geospatial layer data set in response to receiving the request from client device 104. For example, in response to receiving the request, geospatial mapping manager 118 can search geospatial data storage 114 and/or secondary data source(s) 108 for geospatial data for the requested geographic area. Geospatial mapping manager 118 can use data gathered as part of the search to generate the geospatial layer data set.

Alternatively, geospatial mapping manager 118 can access a previously generated geospatial layer data set in response to receiving the request from client device 104. For example, geospatial mapping manager 118 can generate geospatial layer data sets from data gathered from secondary data source(s) 108 and/or geospatial data storage 114. The previously generated geospatial data sets can be stored in geospatial data storage 114 and geospatial mapping manager 118 can communicate with geospatial data storage 114 to retrieve a previously generated geospatial data set in response to receiving a request.

In addition to enabling client device 104 to present a visual rendering of the geographic area, the geospatial data included in the geospatial layer data set can also enable a user of client device 104 to utilize one or more features to interact with the geospatial artifacts. For example, a feature can include causing a label representing a geospatial artifact to be presented, adjusting presentation of the visual labels, accessing additional information describing a geospatial artifact, analytical functions such as creating a histogram or timeline, etc.

Geospatial mapping manager 118 can limit the amount of geospatial artifact data included in a geospatial layer data set. For example, if a large number of geospatial artifacts are located within a geographic area (e.g., when the user selects to view the map at a higher presentation level), geospatial mapping manager 118 can include a limited set of geospatial artifact data for the geospatial artifacts. For example, the limited set of geospatial data can include limited data describing the geospatial artifacts, such as geographic coordinate data for the geospatial artifacts. As another example, the limited data set can include geospatial data for only a subset of the geospatial artifacts included in a geographic area.

Limiting the amount of geospatial artifact data included in the geospatial layer data set can reduce latency associated with generating and/or transmitting the geospatial layer data set. Alternatively, geospatial mapping manager 118 can provide a complete set of geospatial artifact data when a relatively lower number of geospatial artifacts are located within a geographic area (e.g., when the user selects to view the map at a lower presentation level).

Geospatial mapping manager 118 can promote geospatial artifact data into a geospatial layer data set to provide a user with additional and/or advanced features to interact with a geospatial artifact located in a geographic area. In some instances, the limited set of geospatial artifact data included in a geospatial layer data set may be insufficient to provide one or more features for interacting with a geospatial artifact. For example, additional data beyond the geographic coordinate data of a geospatial artifact may be needed to provide a feature such as causing presentation of additional data associated with the geospatial artifact or analytical functions. A user may desire to access these additional features while at a higher viewing level (e.g., without having to zoom in).

In this type of situation, geospatial mapping manager 118 can promote additional geospatial artifact data into a geospatial layer data set. For example, geospatial mapping manager 118 can receive a request from client device 104 indicating that a user of client device 104 would like to utilize a feature that cannot be provided based on the geospatial artifact data included in the geospatial layer data set. In response, geospatial mapping manager 118 can promote additional geospatial artifact data into the geospatial layer data set, which can then be provided to client device 104 to provide the requested feature.

Figure 2:
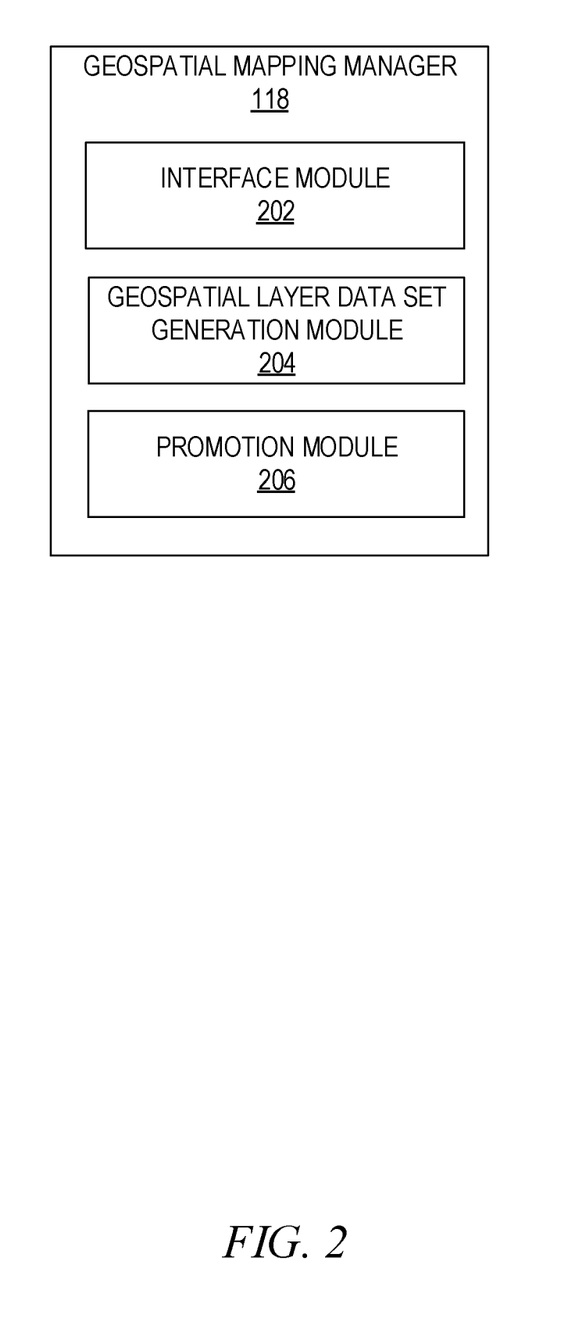
FIG. 2 shows an example block diagram of a geospatial mapping manager, according to some example embodiments.

FIG. 2 shows an example block diagram of geospatial mapping manager 118. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by high functionality data manager 120 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, high functionality data manager 120 includes communication module 202, geospatial layer data set generation module 204, and promotion module 206. Interface module 202 can provide client device 104 with data that enables client device 104 to present a map interface on a display of client device 104. A map interface can be an interactive user interface that allows a user to view and interact with geospatial data. For example, a map interface can present a user with a visual rendering of a geographic area. Further, a map interface can include one or more user interface elements (e.g., buttons, text boxes, scroll bars, etc.) that enable a user to modify presentation of the geographic area, adjust settings, utilize features, etc. For example, the map interface can enable a user to define a geographic area by adjusting a presentation level. As another example, the map interface can enable a user to select to utilize features on a geospatial artifact and/or a group of geospatial artifacts, such as causing a label representing the geospatial artifact(s) to be presented within the map interface.

Geospatial layer data set generation module 204 can be configured to generate a geospatial layer data set. Geospatial layer data set generation module 204 can gather geospatial data from geospatial data storage 114 and/or secondary data sources 108, which can be used to generate the geospatial layer data set. A geospatial layer data set can include geospatial data for a specified geographic area. For example, the geospatial layer data set can include geospatial data, such as map data describing the geographic area. The geospatial layer data set can also include geospatial artifact data for geospatial artifacts located within the geographic area.

A geospatial layer data set can be used to present a user with a visual rendering of a geographic area. For example, a geospatial layer data set can be provided to client device 104, where client device 104 can utilize the geospatial layer data set to present a visual rendering of the geographic area. Alternatively, geospatial mapping manager 118 can utilize the geospatial layer data set to provide data to client device 104, which can be used by client device 104 to present the visual rendering of the geographic area.

In some embodiments, geospatial layer data set generation module 204 can generate a geospatial layer data set in response to receiving a request from client device 104. The request can include data defining a geographic area that the user would like view. For example, a user can utilize the map interface to define the geographic area by adjusting the presentation level, causing client device 104 to transmit the request to geospatial mapping manager 118. In response to geospatial mapping manager 118 receiving the request, geospatial layer data set generation module 204 can gather geospatial data from geospatial data storage 114 and/or secondary data source(s) 108 for the requested geographic area. Geospatial layer data set generation module 204 can use the gathered geospatial data to generate the geospatial layer data set.

In some embodiments, geospatial layer data set generation module 204 can pre-generate geospatial layer data sets. For example, geospatial layer data set generation module 204 can generate geospatial layer data sets for geographic areas based on available presentation levels.

The pre-generated geospatial layer data sets can be stored in geospatial data storage 114 and used to present a visual rendering of a geographic area on client device 104. For example, in response to receiving a request from client device 104 that defines a geographic area, geospatial mapping manager 118 can access geospatial data storage 114 to access an appropriate geospatial layer data set to satisfy the received request.

In some embodiments, geospatial layer data set generation module 204 can limit the amount of geospatial artifact data included in a geospatial layer data set to reduce latency associated with generating and/or transmitting the geospatial layer data set. For example, when a geographic area includes a large number of geospatial artifacts (e.g., when the user is at a higher presentation level), geospatial layer data set generation module 204 can include a limited set of geospatial artifact data in the geospatial layer data set. Alternatively, when a geographic area includes a lower number of geospatial artifacts (e.g., when the user is at a lower presentation level), geospatial layer data set generation module 204 can include a complete set of geospatial artifact data in the geospatial layer data set.

In some embodiments, geospatial mapping manager 118 can promote geospatial artifact data into a geospatial layer data set. Promoting geospatial artifact data into a geospatial layer data set can include accessing the geospatial artifact data from geospatial data storage 114 and/or secondary data source(s) 108, and modifying the geospatial layer data set to include the geospatial artifact data. In some embodiments, promoting geospatial artifact data describing a geospatial artifact can further include copying the geospatial data from secondary data source(s) 108 and storing the copied geospatial artifact data in geospatial data storage 114, where it is associated and/or otherwise linked to a data object for the geospatial artifact.

Promoting the additional geospatial artifact data into a geospatial layer data set can allow a user to utilize additional features associated with the geospatial artifacts without requiring the user to adjust the presentation layer (e.g., zoom in). For example, a user can view a label associated with geospatial artifacts while remaining at a high presentation level.

Promotion module 206 can be configured to promote geospatial artifact data into a generated geospatial layer data set. Promotion module 206 can receive a request from client device 104 to promote geospatial artifact data into a geospatial layer data set and, in response, search geospatial data storage 114 and secondary data source(s) 108 to gather additional geospatial artifact data to include the geospatial layer data set. Promotion module 206 can then update the geospatial layer data set to include the additional geospatial artifact data.

Additionally, in some embodiments, promotion module 206 can store the geospatial data received from secondary data source(s) 108 in geospatial data storage 114. Further, the stored data can be associates with corresponding data objects. For example, geospatial data received from secondary data source(s) 108 that describes a geospatial artifact can be stored in geospatial data storage 114 and associated with a data object for the geospatial artifact.

In some embodiments, the request received from client device 104 can include data identifying a set of geospatial artifacts that a user would like to interact with and thus have geospatial artifact data for the set of geospatial artifacts promoted to the geospatial layer data set. For example, the map interface can enable the user to select geospatial artifact by type, geographic area, etc., that the user would like to promote. For example, the user can select to promote geospatial artifact data for all stores, churches, etc. The resulting request sent to geospatial mapping system 106 can include data identifying the set of geospatial artifacts, which promotion module 206 can use to search geospatial data storage 114 and/or secondary data source(s) 108 for geospatial artifact data.

Figure 3:
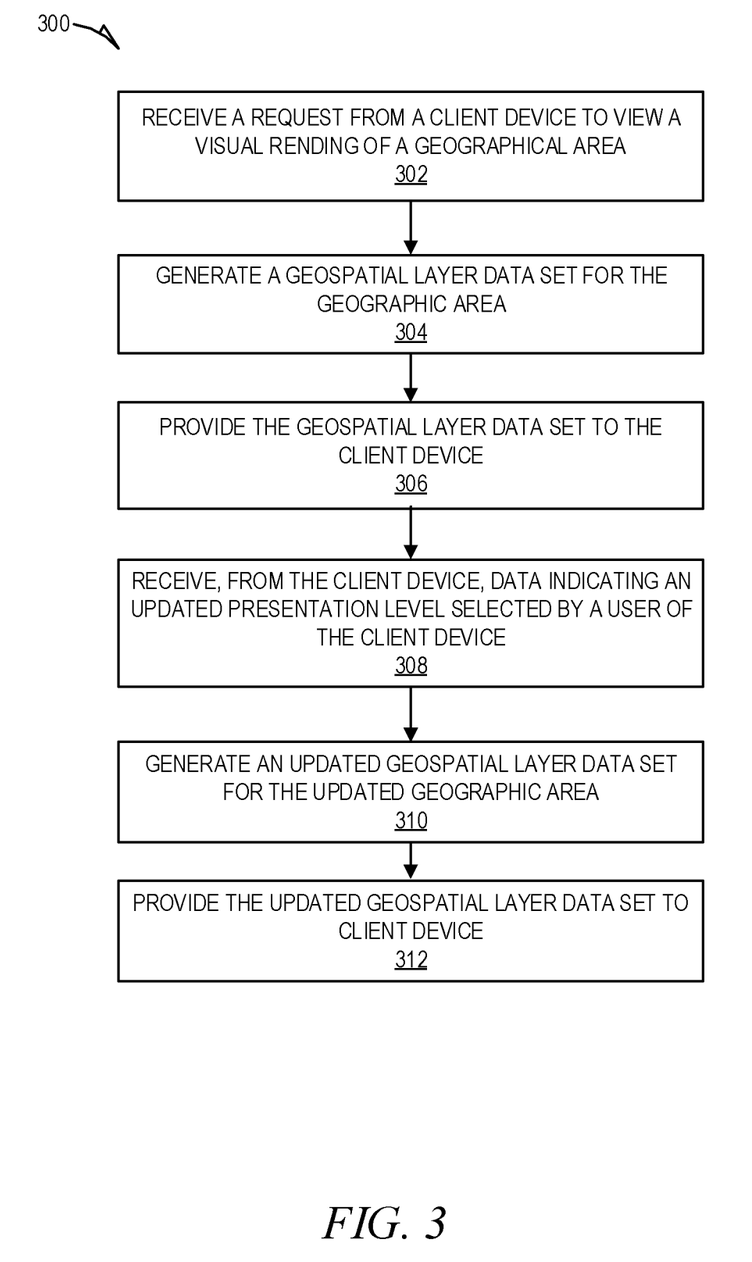
FIG. 3 shows an example method for causing a visual rendering of a geographical area to be presented on a client device, according to some example embodiments.

FIG. 3 shows an example method 300 for causing a visual rendering of a geographical area to be presented on a client device. Method 300 may be embodied in computer-readable instructions for execution by one or more processors such that the operations of method 300 may be performed in part or in whole by geospatial mapping system 106; accordingly, method 300 is described below by way of example with reference thereto. However, it shall be appreciated that at least some of the operations of method 300 may be performed on various other hardware configurations and method 300 is not intended to be limited to geospatial mapping system 106.

At operation 302, geospatial mapping system 106 receives a request from client device 104 to view a visual rendering of a geographical area. The request can include data identifying the geographical area. For example, the request can include data identifying a presentation level (e.g., zoom level) selected by a user of the client device that defines the geographic area.

At operation 304, geospatial layer data set generation module 204 generates a geospatial layer data set for the geographic area. The geospatial layer data set can include geospatial data describing the geographic area, such as map data and geospatial artefact data describing geospatial artifacts located in the geographic area.

In some embodiments, geospatial layer data set generation module 204 can search geospatial data storage 114 and secondary data source(s) 108 to gather the geospatial data to include in the geospatial layer data set. Further, the geospatial layer data set generation module 204 can include a limited set of geospatial artefact data in the geospatial layer data set. The limited set of geospatial artifact data can include limited data describing a geospatial artifact (e.g., only geographic coordinate data and label data), and/or geospatial artifact data describing only a subset of the geospatial artifacts located in the geographic area. Including a limited set of geospatial artifact data can reduce the time and resources required to generate the geospatial layer data set.

At operation 306, interface module 202 can provide the geospatial layer data set to client device 104. Client device 104 can utilize the received geospatial layer data set to present a visual rendering of the geographic area. For example, client-side application 110 can cause the visual rendering of the geographic area to be presented in a map interface.

The visual rendering of the geographic area can include visual representations of geospatial artifacts included in the geographic area. For example, client device 104 can use the label data and geographic coordinate data describing one or more geospatial artifacts to present a visual label, such as a graphical icon, representing the geospatial artifact. The visual label can be presented at a location to represent the geographic location of the geospatial artifact.

In some embodiments, the visual labels can represent a group of geospatial artifacts rather than a separate label being presented at each geospatial artifact. At higher presentation levels this can provide a user with a cleaner view of geographic area.

Although a visual representation of the geospatial artifacts is presented to the user, in some embodiments, additional features cannot be accessed with respect to the presented geospatial artifacts. For example, the user may not be able to select a geospatial artifact to access additional information describing the geospatial artifact without altering the presentation level (e.g., zooming in) or causing geospatial artifact data for the geospatial artifacts to be promoted into the geospatial layer data set.

At operation 308, geospatial mapping system 106 receives, from client device 104, data indicating an updated presentation level selected by a user of client device 104. The updated presentation level can define a smaller geographic as a result of the user selecting to zoom in to the presented geographic area.

At operation 310, geospatial layer data set generation module 204 generates an updated geospatial layer data set for the updated geographic area. The updated geospatial layer data set for the updated geographic area can include additional geospatial artifact data for the geospatial artifacts included in the updated geographic area.

At operation 312, interface module 202 provides the updated geospatial layer data set to client device 104. Client device 104 can utilize the updated geospatial layer data set to present a visual rendering of the updated geographic area. For example, client-side application 110 can cause the visual rendering of the updated geographic area to be presented in a map interface. Further, the additional geospatial artifact data can provide the user with additional features, such as accessing additional information describing a geospatial artifact. A user can therefore adjust the presentation level (e.g., zoom in) to passively access additional features associated with the geospatial artifacts included in a geographic area.

Figure 4:
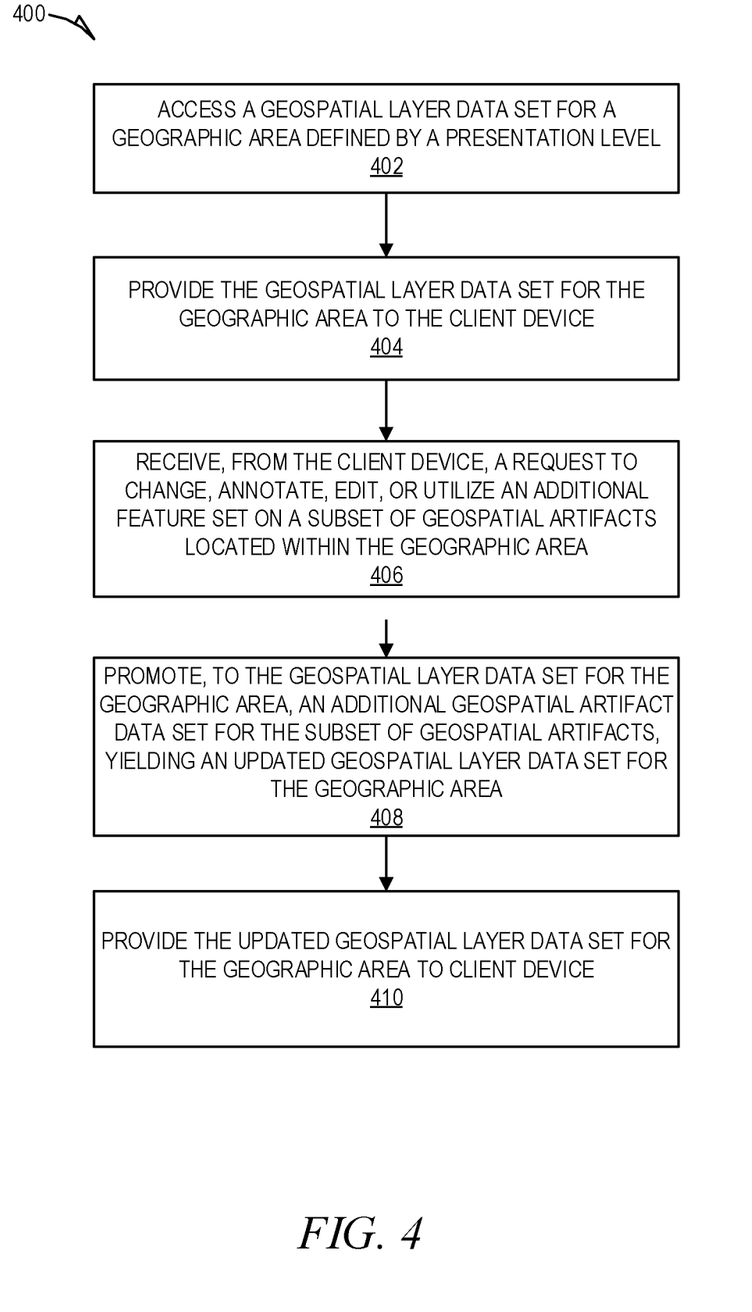
FIG. 4 shows an example method for promoting geospatial artifact data into a geospatial layer data set, according to some example embodiments.

FIG. 4 shows an example method 400 for promoting geospatial artifact data into a geospatial layer data set. Method 400 may be embodied in computer-readable instructions for execution by one or more processors such that the operations of method 400 may be performed in part or in whole by geospatial mapping system 106; accordingly, method 400 is described below by way of example with reference thereto. However, it shall be appreciated that at least some of the operations of method 400 may be deployed on various other hardware configurations and method 400 is not intended to be limited to geospatial mapping 106.

At operation 402, geospatial mapping system 106 accesses a geospatial layer data set for a geographic area defined by a presentation level. The geospatial layer data set for the geographic area includes a limited geospatial artifact data set for geospatial artifacts located within the geographic area. For example, geospatial mapping system 106 can gather a pre-generated geospatial layer data set from geospatial data storage 114. Alternatively, geospatial layer data set generation module 204 can generate the geospatial layer data set.

At operation 404, geospatial mapping system 106 provides the geospatial layer data set for the geographic area to client device 104. Client device 104 uses the geospatial layer data set for the geographic area to present a visual rendering of the geographic area. The limited geospatial artifact data set included in the geospatial layer data set for the geographic area enables client device 104 to provide a limited feature set for interacting with the geospatial artifacts located within the geographic area. For example, a user can view a label representing the geospatial artifacts, however may not be able to interact with the geospatial artifact further to access additional information.

At operation 406, geospatial mapping system 106 receives, from client device 104, a request to change, annotate, edit, or utilize an additional feature set on a subset of geospatial artifacts located within the geographic area.

For example, a user may have selected to annotate a subset of geospatial artifacts such as stores, churches, etc.

At operation 408, promotion module 206 promotes, to the geospatial layer data set for the geographic area, an additional geospatial artifact data set for the subset of geospatial artifacts, yielding an updated geospatial layer data set for the geographic area. For example, promotion module 206 can access the geospatial artifact data from geospatial data storage 114 and/or secondary data source(s) 108. Promotion module 206 then modifies the geospatial layer data set to include the additional geospatial data set for the subset of geospatial artifact.

At operation 410, interface module 202 provides the updated geospatial layer data set for the geographic area to client device 104. The additional geospatial artifact data set included in the updated geospatial layer data set enables client device 104 to provide the advanced feature set for interacting with the subset of geospatial artifacts located within the geographic area. Accordingly, a user can actively access additional features associated with the geospatial artifacts included in a geographic area by promoting geospatial artifact data into the geospatial artifact layer data set.

Figure 5:
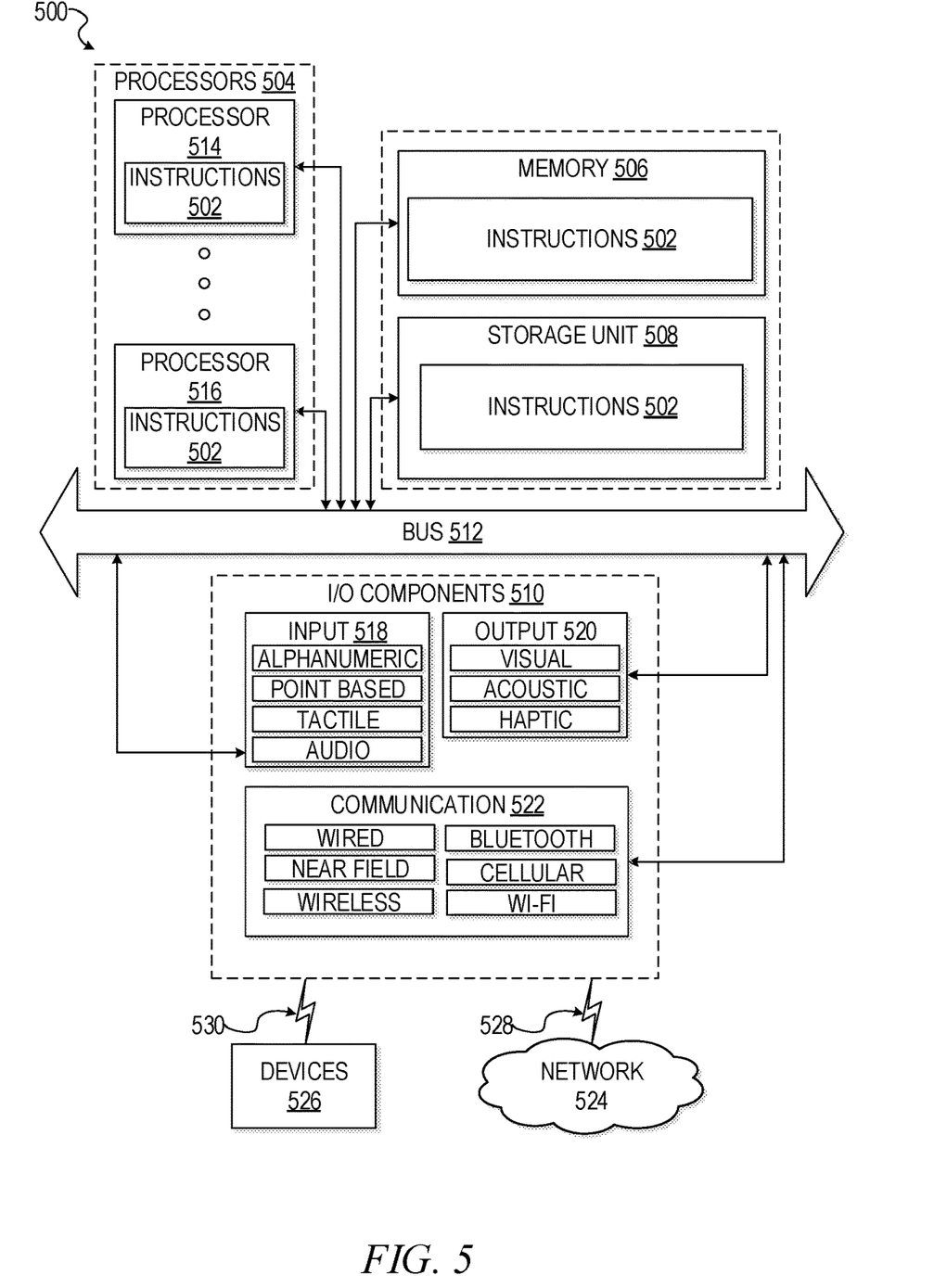
FIG. 5 shows a diagrammatic representation of a computing device in the example form of a computer system within which a set of instructions for causing the computing device to perform any one or more of the methodologies discussed herein may be executed.

FIG. 5 shows a block diagram illustrating components of a computing device 500, according to some example embodiments, able to read instructions from a machine-readable medium (e.g., a machine-readable storage medium) and perform any one or more of the methodologies discussed herein. Specifically, FIG. 5 shows a diagrammatic representation of computing device 500 in the example form of a system, within which instructions 502 (e.g., software, a program, an application, an applet, an app, a driver, or other executable code) for causing computing device 500 to perform any one or more of the methodologies discussed herein may be executed. For example, instructions 502 include executable code that causes computing device 500 to execute methods 300 and 400. In this way, these instructions transform the general, non-programmed computing device into a particular computing device programmed to carry out the described and illustrated functions in the manner described herein. Computing device 500 may operate as a standalone device or may be coupled (e.g., networked) to other machines.

By way of non-limiting example, computing device 500 may comprise or correspond to a television, a computer (e.g., a server computer, a client computer, a PC, a tablet computer, a laptop computer, or a netbook), a set-top box (STB), a PDA, an entertainment media system (e.g., an audio/video receiver), a cellular telephone, a smart phone, a mobile device, a wearable device (e.g., a smart watch), a portable media player, or any machine capable of outputting audio signals and capable of executing instructions 502, sequentially or otherwise, that specify actions to be taken by computing device 500. Further, while only a single computing device 500 is illustrated, the term "machine" shall also be taken to include a collection of computing devices 500 that individually or jointly execute instructions 502 to perform any one or more of the methodologies discussed herein.

Computing device 500 may include processors 504, memory 506, storage unit 508, and I/O components 510, which may be configured to communicate with each other such as via bus 512. In an example embodiment, processors 504 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 514 and processor 516 that may execute instructions 502. The term "processor" is intended to include multi-core processors that may comprise two or more independent processors (sometimes referred to as "cores") that may execute instructions contemporaneously. Although FIG. 5 shows multiple processors, computing device 500 may include a single processor with a single core, a single processor with multiple cores (e.g., a multi-core processor), multiple processors with a single core, multiple processors with multiples cores, or any combination thereof.

Memory 506 (e.g., a main memory or other memory storage) and storage unit 508 are both accessible to processors 504 such as via bus 512. Memory 506 and storage unit 508 store instructions 502 embodying any one or more of the methodologies or functions described herein. In some embodiments, data storage 516 resides on storage unit 508. Instructions 502 may also reside, completely or partially, within memory 506, within storage unit 508, within at least one of processors 504 (e.g., within the processor's cache memory), or any suitable combination thereof, during execution thereof by computing device 500. Accordingly, memory 506, storage unit 508, and the memory of processors 504 are examples of machine-readable media.

As used herein, "machine-readable medium" means a device able to store instructions and data temporarily or permanently and may include, but not be limited to, random-access memory (RAM), read-only memory (ROM), buffer memory, flash memory, optical media, magnetic media, cache memory, other types of storage (e.g., erasable programmable read-only memory (EEPROM)), or any suitable combination thereof. The term "machine-readable medium" should be taken to include a single medium or multiple media (e.g., a centralized or distributed database, or associated caches and servers) able to store instructions 502. The term "machine-readable medium" shall also be taken to include any medium, or combination of multiple media, that is capable of storing instructions (e.g., instructions 502) for execution by a machine (e.g., computing device 500), such that the instructions, when executed by one or more processors of computing device 500 (e.g., processors 504), cause computing device 500 to perform any one or more of the methodologies described herein (e.g., methods 300 and 400). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 510 may include a wide variety of components to receive input, provide output, produce output, transmit information, exchange information, capture measurements, and so on. The specific I/O components 510 that are included in a particular machine will depend on the type of machine. For example, portable machines such as mobile phones will likely include a touch input device or other such input mechanisms, while a headless server machine will likely not include such a touch input device. It will be appreciated that I/O components 510 may include many other components that are not specifically shown in FIG. 5. I/O components 510 are grouped according to functionality merely for simplifying the following discussion and the grouping is in no way limiting. In various example embodiments, I/O components 510 may include input components 518 and output components 520. Input components 518 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components, and the like. Output components 520 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. I/O components 510 may include communication components 522 operable to couple computing device 500 to network 524 or devices 526 via coupling 528 and coupling 530, respectively. For example, communication components 522 may include a network interface component or other suitable device to interface with network 524. In further examples, communication components 522 may include wired communication components, wireless communication components, cellular communication components, near field communication (NFC) components, Bluetooth® components (e.g., Bluetooth® Low Energy), WiFi® components, and other communication components to provide communication via other modalities. The devices 526 may be another machine or any of a wide variety of peripheral devices (e.g., a peripheral device coupled via a Universal Serial Bus (USB)).

Modules, Components, and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between or among such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry; in computer hardware, firmware, or software; or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special-purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice.

Language

Although the embodiments of the present inventive subject matter have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A method comprising:
    accessing a first subset of a geospatial layer data set for a first geographic area, the first subset of the geospatial layer data set for the first geographic area including a first subset of a geospatial artifact data set for geospatial artifacts located within the first geographic area;
    providing to a client device, the first subset of the geospatial layer data set for the first geographic area, the first subset of the geospatial layer data set for the first geographic area enabling the client device to present a visual rendering of the first geographic area and provide a first subset of available features for interacting with the geospatial artifacts located within the first geographic area;
    receiving, from the client device, a request to utilize, in relation to a subset of geospatial artifacts located within the first geographic area, an additional feature that is not included in the first subset of available features, the additional feature being an analytical function, the request to utilize the additional feature having been automatically transmitted in response to a change from a first presentation level defining the first geographic region to a second presentation layer defining a second geographic region, each of the subset of geospatial artifacts being located within the second geographic region, wherein at least one geospatial artifact located within the first geographic area is not located within the second geographic area;

in response to receiving the request, promoting, to the first subset of the geospatial layer data set for the first geographic area, additional geospatial artifact data that was not included in the first subset of a geospatial layer data set, yielding an updated geospatial layer data set for the first geographic area, the updated geospatial layer data set enabling the client device to provide the additional feature; and providing the updated geospatial layer data set for the first geographic area to the client device, the additional geospatial artifact data set included in the updated geospatial layer data set.

2. The method of claim 1, further comprising:
receiving, from the client device, data indicating the second presentation level, the second presentation level having been selected by a user of the client device;
automatically generating a second subset of the geospatial layer data set for the second geographic area that includes the additional geospatial artifact data; and
providing the second subset of the geospatial layer data set for the second geographic area to the client device.

3. The method of claim 1, further comprising:
receiving, from the client device, data indicating the first presentation level defining the first geographic area; and
in response to receiving the data indicating the first presentation level, generating the first subset of the geospatial layer data set for the first geographic area.

4. The method of claim 3, wherein the first presentation level is based on a zoom level selected by a user of the client device.

5. The method of claim 1, wherein promoting additional geospatial artifact data comprises:
modifying the first subset of the geospatial layer data set to include the additional geospatial artifact data.

6. The method of claim 1, wherein the first subset of the geospatial artifact data includes geographic coordinate data identifying geographic locations for the set for geospatial artifacts located within the first geographic area.

7. The method of claim 6, wherein the additional geospatial artifact data includes at least one of a population of a city, name of a business, type of business, type of event and road name.

8. A geospatial mapping system comprising:
one or more computer processors; and
one or more computer readable mediums storing instructions that, when executed by the one or more computer processors, cause the geospatial mapping system to perform operations comprising:
accessing a first subset of a geospatial layer data set for a first geographic area, the first subset of the geospatial layer data set for the first geographic area including a first subset of a geospatial artifact data set for geospatial artifacts located within the first geographic area;
providing to a client device, the first subset of the geospatial layer data set for the first geographic area, the first subset of the geospatial layer data set for the first geographic area enabling the client device to present a visual rendering of the first geographic area and provide a first subset of available features for interacting with the geospatial artifacts located within the first geographic area;
receiving, from the client device, a request to utilize, in relation to a subset of geospatial artifacts located within the first geographic area, an additional feature that is not included in the first subset of available features, the additional feature being an analytical function, the request to utilize the additional feature having been automatically transmitted in response to a change from a first presentation level defining the first geographic region to a second presentation layer that defining a second geographic region, each of the subset of geospatial artifacts being located within the second geographic region, wherein at least one geospatial artifact located within the first geographic area is not located within the second geographic area;
in response to receiving the request, promoting, to the first subset of the geospatial layer data set for the first geographic area, additional geospatial artifact data that was not included in the first subset of a geospatial layer data set, yielding an updated geospatial layer data set for the first geographic area, the updated geospatial layer data set enabling the client device to provide the additional feature; and
providing the updated geospatial layer data set for the first geographic area to the client device, the additional geospatial artifact data set included in the updated geospatial layer data set.

9. The geospatial mapping system of claim 8, the operations further comprising:
receiving, from the client device, data indicating the second presentation level, the second presentation level having been selected by a user of the client device;
automatically generating a second subset of the geospatial layer data set for the second geographic area that includes the additional geospatial artifact data; and
providing the second subset of the geospatial layer data set for the second geographic area to the client device.

10. The geospatial mapping system of claim 8, the operations further comprising:
receiving, from the client device, data indicating the first presentation level defining the first geographic area; and
in response to receiving the data indicating the first presentation level, generating the first subset of the geospatial layer data set for the first geographic area.

11. The geospatial mapping system of claim 10, wherein the first presentation level is based on a zoom level selected by a user of the client device.

12. The geospatial mapping system of claim 8, wherein promoting additional geospatial artifact data comprises:
modifying the first subset of the geospatial layer data set to include the additional geospatial artifact data.

13. The geospatial mapping system of claim 8, wherein the first subset of the geospatial artifact data includes geographic coordinate data identifying geographic locations for the set for geospatial artifacts located within the first geographic area.

14. The geospatial mapping system of claim 13, wherein the additional geospatial artifact data includes at least one of a population of a city, name of a business, type of business, type of event and road name.

15. A non-transitory computer-readable medium storing instructions that, when executed by one or more computer processors of a geospatial mapping system, cause the geospatial mapping system to perform operations comprising:
accessing a first subset of a geospatial layer data set for a first geographic area, the first subset of the geospatial layer data set for the first geographic area including a first subset of a geospatial artifact data set for geospatial artifacts located within the first geographic area;
providing to a client device, the first subset of the geospatial layer data set for the first geographic area, the first subset of the geospatial layer data set for the first geographic area enabling the client device to present a visual rendering of the first geographic area and provide a first subset of available features for interacting with the geospatial artifacts located within the first geographic area;

receiving, from the client device, a request to utilize, in relation to a subset of geospatial artifacts located within the first geographic area, an additional feature that is not included in the first subset of available features, the additional feature being an analytical function, the request to utilize the additional feature having been automatically transmitted in response to a change from a first presentation level defining the first geographic region to a second presentation layer that defining a second geographic region, each of the subset of geospatial artifacts being located within the second geographic region, wherein at least one geospatial artifact located within the first geographic area is not located within the second geographic area;

in response to receiving the request, promoting, to the first subset of the geospatial layer data set for the first geographic area, additional geospatial artifact data that was not included in the first subset of a geospatial layer data set, yielding an updated geospatial layer data set for the first geographic area, the updated geospatial layer data set enabling the client device to provide the additional feature; and providing the updated geospatial layer data set for the first geographic area to the client device, the additional geospatial artifact data set included in the updated geospatial layer data set.

16. The non-transitory computer-readable medium of claim 15, the operations further comprising:
receiving, from the client device, data indicating the second presentation level, the second presentation level having been selected by a user of the client device;
automatically generating a second subset of the geospatial layer data set for the second geographic area that includes the additional geospatial artifact data; and
providing the second subset of the geospatial layer data set for the second geographic area to the client device.

17. The non-transitory computer-readable medium of claim 15, the operations further comprising:
receiving, from the client device, data indicating the first presentation level defining the first geographic area; and
in response to receiving the data indicating the first presentation level, generating the first subset of the geospatial layer data set for the first geographic area.

18. The non-transitory computer-readable medium of claim 17, wherein the first presentation level is based on a zoom level selected by a user of the client device.

19. The non-transitory computer-readable medium of claim 15, wherein promoting additional geospatial artifact data comprises:
modifying the first subset of the geospatial layer data set to include the additional geospatial artifact data.

20. The non-transitory computer-readable medium of claim 15, wherein the first subset of the geospatial artifact data includes geographic coordinate data identifying geographic locations for the set for geospatial artifacts located within the first geographic area.

* * * * *